Nov. 15, 1966 O. G. FOULGER 3,286,200

PULSE-AMPLITUDE TO PULSE-DURATION CONVERTER APPARATUS

Filed Feb. 18, 1964

INVENTOR.
ORSON G. FOULGER
BY
ATTORNEY.

3,286,200
Patented Nov. 15, 1966

3,286,200

PULSE-AMPLITUDE TO PULSE-DURATION CONVERTER APPARATUS

Orson G. Foulger, Goleta, Calif., assignor to The United States of America as represented by the Secretary of the Navy Filed Feb. 18, 1964, Ser. No. 346,063
4 Claims. (Cl. 332—1)

The invention described herein may be manufactured and used by or for the Government of the United States of America for governmental purposes without the payment of any royalties thereon or therefor.

The present invention relates generally to pulse-shaping apparatus and more particularly to a novel pulse-amplitude to pulse-duration converter apparatus.

While the invention is of general utility in many different circuit environments, it may specifically and advantageously be employed as a pulse width modulator in the reference comparator described in copending patent application S.N. 346,062 entitled, "Pulse Comparator and Converter," filed February 18, 1964, by Orson G. Foulger.

First briefly considering such environment of the present invention, therefore, the said reference comparator forms a part of target direction sensing apparatus in an anti-radar homing missile and operates to provide output pulses which are of polarity and time-width corresponding to input pulse amplitude relative to a reference pulse amplitude level K which closely approximates the average amplitude of the input pulses. In a typical instance the input pulses may be of positive polarity, of the order of one microsecond in time-width (duration), repetitive at an audio frequency rate of the order of 1000 pulses per second, and variable in amplitude above and below the reference level K to an extent dependent principally upon missile axis deviation relative to the line-of-sight to the target radar. The pulse width modulator forming one of the units in the aforementioned reference comparator may take any conventional form, but that here disclosed presents significant reduction of complexity, resulting in improved reliability and compactness in comparison to prior art pulse width modulators and thus affords significant advantages for missile use.

It is therefore a primary object of this invention to provide an improved pulse-amplitude to pulse-duration converter apparatus having simplified circuitry yielding increased compactness and reliability for missile use.

It is a further object of this invention to provide an improved pulse-amplitude to pulse-duration converter having a substantially linear transfer characteristic.

These and other objects and advantages of this invention will be readily appreciated as the same becomes better understood by reference to the following description when considered in connection with the ccompanying drawing wherein.

Figure 1:
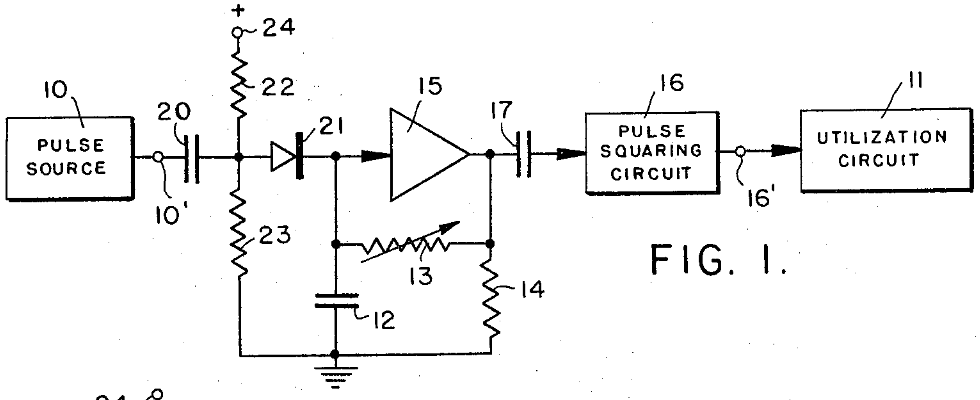
FIG. 1 illustrates principally in block diagram form a complete system including an exemplary embodiment of the novel pulse-amplitude to pulse-duration converter apparatus in accordance with the present invention.
Figure 2:
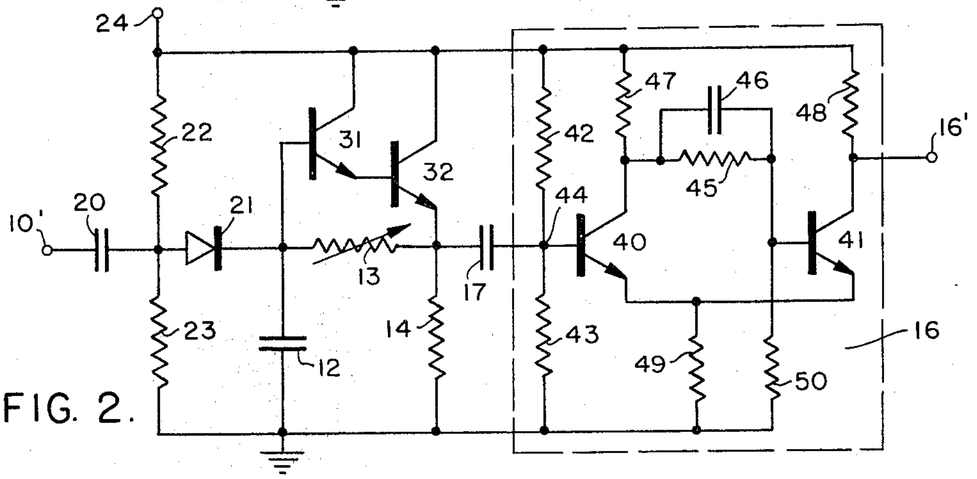
FIG. 2 depicts a preferred circuit for the pulse-amplitude to pulse-duration converter apparauts.
Figure 3:
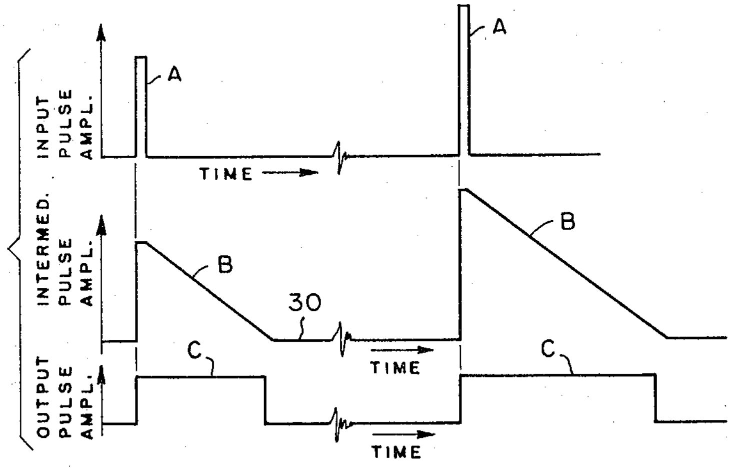
FIG. 3 is an explanatory group of waveforms, of input, intermediate and output voltage pulses of the pulse-amplitude to pulse-duration converter apparatus.

Referring now to the drawing, wherein like reference characters in FIGS. 1 and 2 designate like or corresponding circuit elements, FIG. 1 illustrates the pulse-amplitude to pulse-duration converter apparatus, associated with an input pulse source 10 and an output pulse utilization circuit 11 to form a complete system, wherein each of the diagrammatic blocks may separately be entirely conventional. The pulse-amplitude to pulse-duration converter apparatus comprises, basically, a charge storage capacitor 12, a discharge circuit comprising principally a so-called slope control resistor 13 and an amplifier load resistor 14, a unity-gain non-inverting amplifier 15 shunting resistor 13 and serving to linearize the capacitor discharge, and a circuit 16, here generically termed a pulse-squaring circuit, to which the voltage pulse developed across amplifier load resistor 14 is coupled through capacitor 17. Input pulses of comparatively short duration (relative to the time-widths of the pulses resulting across amplifier load resistor 14 due to discharge of the storage capacitor 12), of variable amplitude, and of positive polarity, as shown at A in FIG. 3, are supplied by pulse source 10 at terminal 10′ to coupling capacitor 20, and through steering diode 21 to storage capacitor 12. Steering diode 21 is suitably poled to enable substantially instantaneous charging of storage capacitor 12 by the positive input pulses, and to confine the discharge of said storage capacitor (upon termination of the input pulse) to take place through succeeding circuit elements. Series-connected resistors 22 and 23, and a positive voltage applied to their upper terminal 24, serve to bias diode 21 in a forward direction and to establish the quiescent operating condition of amplifier 15, also balancing out the barrier potential of diode 21 so that the total amplitude of the input pulse is effective in charging storage capacitor 12.

Application of an input pulse A (FIG. 3) to the storage capacitor 12 of the pulse-amplitude to pulse-duration converter apparatus, resulting in nearly instantaneous charging of storage capacitor 12 because of low forward resistance of diode 21, and the ensuing discharge of capacitor 12 through principally the series-connected resistors 13 and 14, results in development, across output resistor 14, of a voltage pulse as illustrated at B (FIG. 3), hereinafter termed an intermediate pulse and characterized by a substantially instantaneous increase in amplitude to a peak amplitude dependent upon that of the input pulse, followed by decay, due to capacitor 12 discharge, to the zero pulse-amplitude axis 30. By action of the unity-gain non-inverting amplifier 15 in the illustrated combination, which maintains a constant voltage between the amplifier terminals shunting resistor 13, the current through resistor 13 and consequently the discharge current of capacitor 12 is maintained at constant value, and the slope of the intermediate pulses B developed across output resistor 14 correspondingly remains constant, as indicated. The pulse-duration of intermediate pulse B is thus proportional to the amplitude of the input pulse A, the proportionality factor being a function of the microfarad value of storage capacitor 12, and of the discharge current through resistor 13 as effectively determined by the ohmic value of resistor 13 and the substantially constant voltage provided and maintained thereacross by amplifier 15. The proportionality factor in this instance is made adjustable by providing resistor 13 in variable form, as indicated, for that reason being here termed a slope control resistor.

Pulse-squaring circuit 16 may be of any suitable type operating to yield at terminal 16′ an output pulse C (FIG. 3) of fixed amplitude and of time-width substantially equal to that of intermediate pulse B. Utilization circuit 11 may likewise be of any type requiring rectangular pulses C of time-width substantially proportional to the variable amplitude of input pulses A; by way of example, the utilization circuit in the previously mentioned copending application takes the form of a summation circuit to which are also supplied reference pulses of fixed amplitude equal to that of pulses C, but of opposite polarity, and of fixed duration (related to a reference input pulse level K), so that the utilization circuit (in the copending application) in turn yields pulses of polarity and time-width corresponding to input pulse amplitude relative to the reference pulse amplitude level, as described in detail in the said copending application.

In a preferred circuit for the pulse-amplitude to pulse-duration converter apparatus as illustrated in FIG. 2, employing transistors in the amplifier 15 and pulse squaring circuit 16 of FIG. 1, the amplifier is essentially of emitter-follower type, in this instance comprising two NPN transistors 31 and 32 in Darlington connection characterized by an $\alpha$ parameter (ratio of collector current to emitter current) very close to unity (in fact having a value of about 0.9996), a correspondingly very small base current, and an input impedance enhanced by the factor of $1/(1-\alpha)$ relative to the value obtained with a single-transistor emitter-follower amplifier with the same load, as described for example at page 373 in "Transistors and Active Circuits" by Linvill and Gibbons (McGraw-Hill Book Co., 1961). Pulse-squaring circuit 16 is here provided as a Schmitt trigger circuit having the configuration shown for example at page 169 in the "GE Transistor Manual" (General Electric Co., 6th ed., 1962). The circuit employs a pair of NPN type transistors 40 and 41 in a two-stage bistable multivibrator arrangement, as shown, in which a triggering level, in part set by the voltage divider comprising resistors 42 and 43, must be exceeded by the signal applied to junction 44 to effect switching of transistor 40 from its normally "OFF" condition to an "ON" condition, accompanied by switching of transistor 41 to an "OFF" condition. As indicated, the two stages are directly coupled by resistor 45 shunted by capacitor 46 to provide better response, the circuit being completed by resistors 47, 48, 49 and 50.

Figure 4:
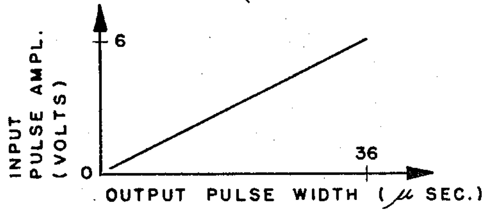
FIG. 4 is a graph illustrating linearity of the transfer characteristic of the pulse-amplitude to pulse-duration converter apparatus.

As an example of specific design of the circuit detailed in FIG. 2, resulting in the particular transfer characteristic illustrated in FIG. 4, the voltage applied to terminal 24 may be 12 volts (positive), and the various elements of the circuit may be as follows:

| | | |
|---|---|---|
| Capacitor **12** | picofarads | 110 |
| Capacitor **20** | microfarads | 0.22 |
| Capacitor **17** | do | 0.22 |
| Capacitor **46** | picofarads | 300 |
| Diode **21** | Fairchild | FD200 |
| Transistor **31** | | 2N744 |
| Transistor **32** | | 2N744 |
| Transistor **40** | | 2N744 |
| Transistor **41** | | 2N744 |
| Resistor **13** | ohms | 68,000 |
| Resistor **14** | do | 1,200 |
| Resistor **22** | do | 15,000 |
| Resistor **23** | do | 8,200 |
| Resistor **42** | do | 24,000 |
| Resistor **43** | do | 1,200 |
| Resistor **45** | do | 510 |
| Resistor **47** | do | 1,200 |
| Resistor **48** | do | 1,200 |
| Resistor **49** | do | 240 |
| Resistor **50** | do | 220 |

Obviously many modifications and variations of the present invention are possible in the light of the above teachings. It is therefore to be understood that within the scope of the appended claims the invention may be practiced otherwise than as specifically described.

What is claimed is:

1. A pulse-shaping apparatus for providing an output pulse whose duration is directly proportional to the amplitude of an applied input pulse, wherein the duration of said input pulse is small relative to that of said output pulse, said pulse-shaping apparatus comprising, in combination:

(a) a charge storage capacitor;

(b) means for applying said input pulse to said capacitor to effect charging thereof to a voltage corresponding to that of said input pulse;

(c) capacitor discharge circuit means effective upon termination of said input pulse to discharge said capacitor at a predetermined and substantially constant rate;

(d) said capacitor discharge circuit means including a unity-gain non-inverting amplifier having a shunting resistor and an output load resistor across which is developed an intermediate pulse characterized by a substantially instantaneous increase in amplitude from a zero pulse-amplitude axis to a peak amplitude corresponding to that of said input pulse and by subsequent decay to said axis during a time interval proportional to said peak amplitude; and (e) squaring circuit means responsive to said intermediate pulse to yield an output pulse of substantially constant amplitude and of duration substantially equal to that of said intermediate pulse.

2. A pulse-shaping apparatus for providing an output pulse whose duration is directly proportional to the amplitude of an applied input pulse, wherein the duration of said input pulse is small relative to that of said output pulse, said pulse-shaping apparatus comprising, in combination:

(a) a charge storage capacitor;

(b) means including a steering diode for application of said input pulse directly to said capacitor to effect substantially instantaneous charging thereof to a voltage corresponding to that of said input pulse;

(c) capacitor discharge circuit means effective upon termination of said input pulse to discharge said capacitor at a predetermined and substantially constant rate;

(d) said capacitor discharge circuit means including a unity-gain non-inverting amplifier having a shunting resistor and an output load resistor across which is developed an intermediate pulse characterized by a substantially instantaneous increase in amplitude from a zero pulse-amplitude axis to a peak amplitude corresponding to that of said input pulse and by subsequent decay to said axis during a time interval proportional to said peak amplitude; and (e) squaring circuit means responsive to said intermediate pulse to yield an output pulse of substantially constant amplitude and of duration substantially equal to that of said intermediate pulse.

3. A pulse-shaping apparatus for providing an output pulse whose duration is directly proportional to the amplitude of an applied input pulse, wherein the duration of said input pulse is small relative to that of said output pulse, said pulse-shaping apparatus comprising, in combination:

(a) a charge storage capacitor;

(b) means for applying said input pulse to said capacitor to effect charging thereof to a voltage corresponding to that of said input pulse;

(c) capacitor discharge circuit means effective upon termination of said input pulse to discharge said capacitor at a predetermined and substantially constant rate;

(d) said capacitor discharge circuit means including an emitter-follower transistor type amplifier having a shunting resistor and an output load resistor across which is developed an intermediate pulse characterized by a substantially instantaneous increase in amplitude from a zero pulse-amplitude axis to a peak amplitude corresponding to that of said input pulse and by subsequent decay to said axis during a time interval proportional to said peak amplitude; and (e) squaring circuit means responsive to said intermediate pulse to yield an output pulse of substantially constant amplitude and of duration substantially equal to that of said intermediate pulse.

4. A pulse-shaping apparatus for providing an output pulse whose duration is directly proportional to the amplitude of an applied input pulse, wherein the duration of said input pulse is small relative to that of said output pulse, said pulse-shaping apparatus comprising, in combination:

(a) a charge storage capacitor;

(b) means including a steering diode for application of said input pulse directly to said capacitor to effect substantially instantaneous charging thereof to a voltage corresponding to that of said input pulse;

(c) capacitor discharge circuit means effective upon termination of said input pulse to discharge said capacitor at a predetermined and substantially constant rate;

(d) said capacitor discharge circuit means including a Darlington-connected transistor type amplifier having a shunting resistor and an output load resistor across which is developed an intermediate pulse characterized by a substantially instantaneous increase in amplitude from a zero pulse-amplitude axis to a peak amplitude corresponding to that of said input pulse and by subsequent decay to said axis during a time interval proportional to said peak amplitude; and (e) squaring circuit means responsive to said intermediate pulse to yield an output pulse of substantially constant amplitude and of duration substantially equal to that of said intermediate pulse.

References Cited by the Examiner

UNITED STATES PATENTS

| | | | |
|---|---|---|---|
| 3,068,421 | 12/1962 | Duerdoth | 332—9 |
| 3,136,961 | 6/1964 | Schraivogel | 332—1 X |

ROY LAKE, *Primary Examiner.*

A. L. BRODY, *Assistant Examiner.*